United States Patent
Calarco et al.

(10) Patent No.: US 7,241,409 B2
(45) Date of Patent: Jul. 10, 2007

(54) GAS PERMEABLE FLEXIBLE GRAPHITE SHEET MATERIAL AND PROCESS THEREFOR

(75) Inventors: Paul Calarco, Westlake, OH (US); Robert Angelo Mercuri, Seven Hills, OH (US); Matthew George Getz, Medina, OH (US); Lawrence K. Jones, Parma, OH (US); Thomas William Weber, Cleveland, OH (US); Mehmet Suha Yazici, Parma Heights, OH (US); Jeremy H. Klug, Union, KY (US)

(73) Assignee: Advanced Energy Technology Inc., Lakewood, OH (US)

( * ) Notice: Subject to any disclaimer, the term of this patent is extended or adjusted under 35 U.S.C. 154(b) by 128 days.

(21) Appl. No.: 10/977,333

(22) Filed: Oct. 29, 2004

(65) Prior Publication Data

US 2006/0091573 A1   May 4, 2006

(51) Int. Cl.
*B29C 67/20* (2006.01)

(52) U.S. Cl. .......................... 264/49; 29/458; 29/527.1; 264/42; 264/119; 264/293; 423/448

(58) Field of Classification Search ................ 264/42, 264/49, 119, 293; 423/448; 29/458, 527.1
See application file for complete search history.

(56) References Cited

U.S. PATENT DOCUMENTS

| | | | |
|---|---|---|---|
| 3,404,061 A | 10/1968 | Shane et al. ................. | 161/125 |
| 4,414,142 A * | 11/1983 | Vogel et al. ................. | 252/506 |
| 4,895,713 A | 1/1990 | Greinke et al. ............. | 423/448 |
| 4,988,583 A | 1/1991 | Watkins et al. .............. | 429/30 |
| 5,300,370 A | 4/1994 | Washington et al. .......... | 429/34 |
| 5,385,700 A * | 1/1995 | Denton ........................ | 264/28 |
| 5,942,347 A * | 8/1999 | Koncar et al. ................ | 429/30 |
| 6,087,034 A | 7/2000 | Mercuri ....................... | 429/44 |
| 6,143,218 A * | 11/2000 | Mercuri ....................... | 264/51 |
| 6,432,336 B1 * | 8/2002 | Mercuri et al. ............... | 264/51 |
| 6,528,199 B1 | 3/2003 | Mercuri et al. ............... | 429/40 |
| 6,746,771 B2 * | 6/2004 | Ottinger et al. ............. | 428/413 |
| 6,781,817 B2 * | 8/2004 | Andelman .................. | 361/503 |

OTHER PUBLICATIONS

European Patent Application EP 1 184 923 A2 filed Aug. 16, 2001 by Ballard Power Systems Inc.
International Publication WO 01/54213 A1 filed Jan. 19, 2001 by Graftech Inc.
International Publication WO 95/16287 filed Dec. 9, 1994 by Ballard Power Systems Inc.

* cited by examiner

*Primary Examiner*—Allan R. Kuhns
(74) *Attorney, Agent, or Firm*—Waddey & Patterson; James R. Cartiglia

(57) ABSTRACT

A process for preparing a gas permeable flexible graphite sheet is presented. The process includes providing graphite flakes; admixing the graphite flakes with a sacrificial additive to form a graphite mixture; compressing the graphite mixture into a sheet having sacrificial additive dispersed therethrough; and treating the sheet to at least partially remove the sacrificial additive to form a permeable flexible graphite sheet.

15 Claims, 2 Drawing Sheets

GAS PERMEABLE FLEXIBLE GRAPHITE SHEET MATERIAL AND PROCESS THEREFOR

TECHNICAL FIELD

The present invention relates to processes for the manufacturing of materials useful in forming fuel cell components, and more particularly relates to such processes in which the materials are formed from a mass of expanded particles of graphite.

BACKGROUND OF THE ART

An ion exchange membrane fuel cell, more specifically a proton exchange membrane (PEM) fuel cell, produces electricity through the chemical reaction of hydrogen and oxygen in the air. Within the fuel cell, electrodes denoted as anode and cathode surround a polymer electrolyte to form what is generally referred to as a membrane electrode assembly, or MEA. Oftentimes, the electrodes also function as the gas diffusion layer (or GDL) of the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell includes a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which joins with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen is removed. Combinations of such fuel cells are used in a fuel cell stack to provide the desired voltage.

Materials useful in forming fuel cell components such as electrodes are often manufactured from graphite materials. Particularly such components are often formed from flexible sheet graphite material, which has most often been formed through calendering processes and then mechanically impacted to form channels therethrough for fluid permeability.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional such as thermal and electrical conductivity.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been greatly expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, foils, mats or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity due to orientation of the expanded graphite particles and graphite layers substantially parallel to the opposed faces of the sheet resulting from very high compression. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.04 g/cc to about 2.0 g/cc. The flexible graphite sheet material exhibits an appreciable degree of anisotropy due to the alignment of graphite particles parallel to the major opposed, parallel surfaces of the sheet, with the degree of anisotropy increasing upon compression of the sheet material to increase orientation. In compressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal and electrical properties of the sheet are very different, by orders of magnitude, for the "c" and "a" directions.

One process that has recently been proposed for the manufacture of the electrodes of the membrane electrode assembly involved mechanically impacting a sheet of flexible graphite material to form channels through the thickness of the sheet, and/or to form open grooves in the surface of the sheet. Such processes are shown for example in International Publication WO 01/54213 A1, which is assigned to the assignee of the present invention, and the details of which are incorporated herein by reference. In addition, Mercuri, in U.S. Pat. No. 6,087,034 (the details of which are incorporated herein by reference) discloses the production of a fluid permeable flexible graphite sheet usable as a fuel cell electrode, where channels are formed in the sheet by the inclusion of non-reactive ceramic fibers with particles of expanded graphite before formation of the sheet. Optionally, a resin or pitch can be impregnated into the sheet after formation to partially fill the channels, and the resin or pitch then formed into coke to provide increased strength.

There is a continuing need for further and improved methods of manufacturing such materials.

SUMMARY OF THE INVENTION

The present invention provides methods for manufacturing materials useful in forming fuel cell components, wherein the materials are formed from a mass of particles of expanded graphite compressed into sheet form. These flexible graphite sheets are rendered permeable to gas by including a sacrificial additive with the expanded graphite particles, preferably prior to compression, and then treating the sheet to at least partially remove the sacrificial additive, resulting in a sheet having a porous structure through which certain gases can permeate.

By the present method the mass of expanded particles of graphite is formed into a sheet, denoted a flexible graphite sheet, having parallel opposed first and second surfaces and having a plurality of transfer fluid channels or pathways passing through the sheet between the first and second parallel opposed surfaces. Preferably the compression of the particles is accomplished by calendering or compression molding.

The inclusion and then removal of a sacrificial additive in the sheet results in a material which has an internal structure which can be characterized as a "foam" or a "honeycomb" structure. In this way, the surface of the sheet is relatively flat and has channel openings, or pores, dispersed relatively uniformly thereabout. Indeed, for two sheets having about the same gas permeability, one formed by the process of the present invention and one formed by mechanical impaction, the surface pores formed by the inventive process are smaller in size individually yet can collectively take up approximately as much of the surface area of the sheet as the channel openings formed by mechanical impaction. This can have significant advantages in terms of fuel cell efficiency.

More specifically, in the operation of a PEM fuel cell the catalyst is conventionally uniformly coated or painted on the membrane or other component, but chemical reactions typically occur at specific places in the system. These reactions primarily occur at the interface of three components: the electrode (or gas diffusion layer), the membrane, and the catalyst. Where the gas is passing through to the membrane through relatively large channel openings, the reaction can only occur about the periphery of the openings where the electrode physically contacts the membrane and catalyst and, therefore, catalyst present on the membrane at locations corresponding to the openings themselves, not at the periphery, is not utilized. Where, as in the instant invention, the channel openings are smaller and more numerous, the locations for catalytic reaction are therefore much greater since the areas of contact between the electrode and the membrane and catalyst is increased and fuel cell efficiency enhanced.

Accordingly, it is an object of the present invention to provide improved methods of manufacture of materials useful in the forming of fuel cell components.

Another object of the present invention is to provide a method for the formation of a sheet of flexible graphite having sufficient gas permeability to be useful for forming a fuel cell component.

Yet another object of the present invention is the provision of methods of forming such materials by the inclusion of sacrificial additives that can be removed after compression of particles of expanded graphite into sheet form.

Still another object of the present invention is the provision of improved materials useful in forming a fuel cell component.

Other and further objects, features, and advantages of the present invention will be readily apparent to those skilled in the art, upon a reading of the following disclosure when taken in conjunction with the accompanying drawings.

DETAILED DESCRIPTION OF THE INVENTION

Figure 1:
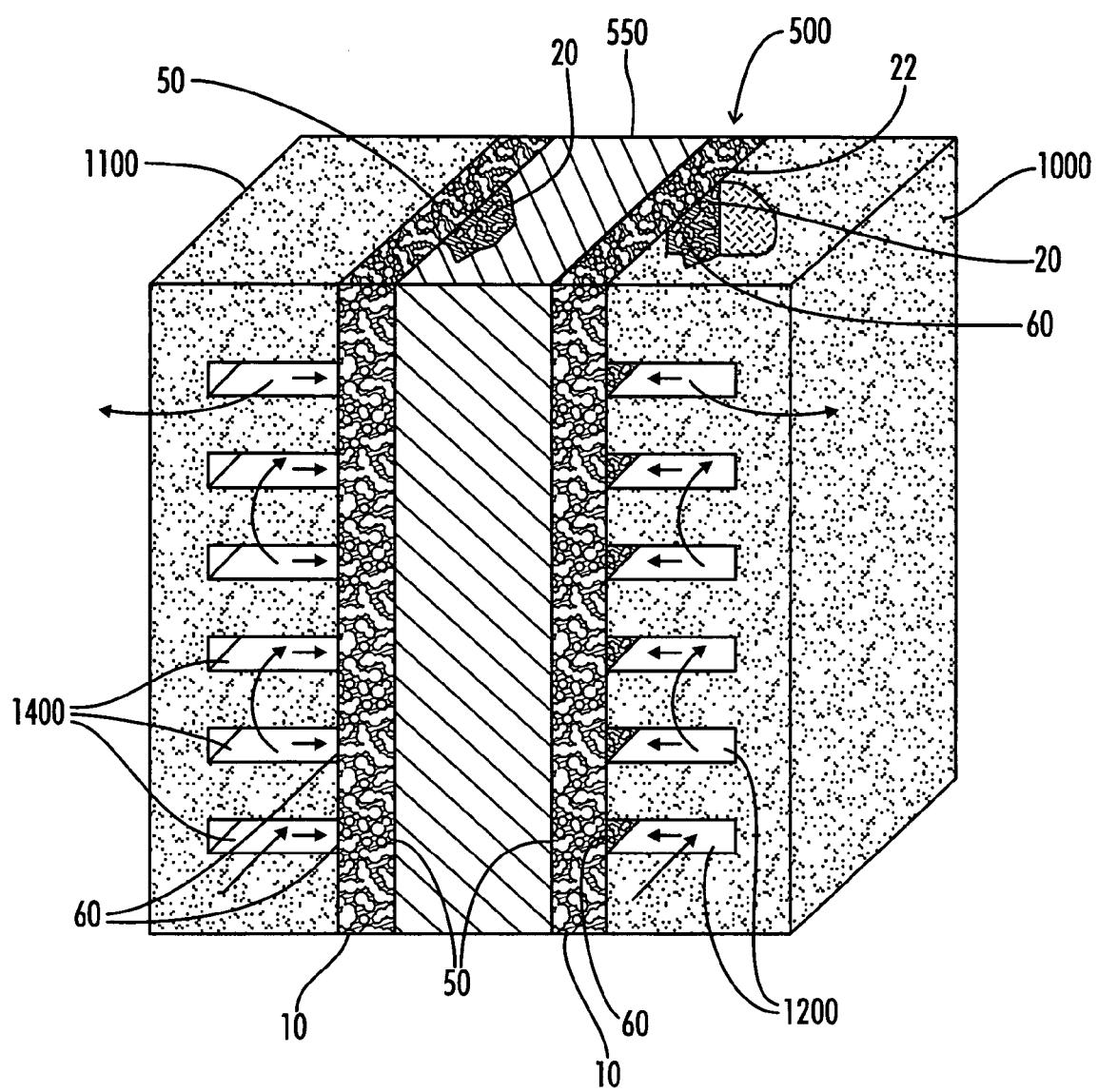
FIG. 1 is a schematic sectioned view of a fuel cell incorporating electrodes formed from the material of the present invention.

Graphite is a crystalline form of carbon comprising atoms covalently bonded in flat layered planes with weaker bonds between the planes. In obtaining source materials such as the above flexible sheets of graphite, particles of graphite, such as natural graphite flake, are typically treated with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials for the flexible sheets suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as graphite prepared by chemical vapor deposition, high temperature pyrolysis of polymers, or crystallization from molten metal solutions, and the like. Natural graphite is most preferred.

The graphite starting materials for the flexible sheets used in the present invention may contain non-graphite components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than six weight percent. More preferably, the graphite employed for the present invention will have a purity of at least about 98%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 350 pph and more typically about 40 to about 160 pph. After the flakes are intercalated, any excess solution is drained from the flakes and the flakes are water-washed.

Alternatively, the quantity of the intercalation solution may be limited to between about 10 and about 40 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2-12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1, 4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalated graphite flake with the organic reducing agent, the blend can be exposed to temperatures in the range of 25° to 125° C. to promote reaction of the reducing agent and intercalated graphite flake. The heating period is up to about 20 hours, with shorter heating periods, e.g., at least about 10 minutes, for higher temperatures in the above-noted range. Times of one-half hour or less, e.g., on the order of 10 to 25 minutes, can be employed at the higher temperatures.

The above described methods for intercalating and exfoliating graphite flake may beneficially be augmented by a pretreatment of the graphite flake at graphitization temperatures, i.e. temperatures in the range of about 3000° C. and above and by the inclusion in the intercalant of a lubricious additive.

The pretreatment, or annealing, of the graphite flake results in significantly increased expansion (i.e., increase in expansion volume of up to 300% or greater) when the flake is subsequently subjected to intercalation and exfoliation. Indeed, desirably, the increase in expansion is at least about 50%, as compared to similar processing without the annealing step. The temperatures employed for the annealing step should not be significantly below 3000° C., because temperatures even 100° C. lower result in substantially reduced expansion.

The annealing of the present invention is performed for a period of time sufficient to result in a flake having an enhanced degree of expansion upon intercalation and subsequent exfoliation. Typically the time required will be 1 hour or more, preferably 1 to 3 hours and will most advantageously proceed in an inert environment. For maximum beneficial results, the annealed graphite flake will also be subjected to other processes known in the art to enhance the degree expansion—namely intercalation in the presence of an organic reducing agent, an intercalation aid such as an organic acid, and a surfactant wash following intercalation. Moreover, for maximum beneficial results, the intercalation step may be repeated.

The annealing step of the instant invention may be performed in an induction furnace or other such apparatus as is known and appreciated in the art of graphitization; for the temperatures here employed, which are in the range of 3000° C., are at the high end of the range encountered in graphitization processes.

Because it has been observed that the worms produced using graphite subjected to pre-intercalation annealing can sometimes "clump" together, which can negatively impact area weight uniformity, an additive that assists in the formation of "free flowing" worms is highly desirable. The addition of a lubricious additive to the intercalation solution facilitates the more uniform distribution of the worms across the bed of a compression apparatus (such as the bed of a calender station conventionally used for compressing (or "calendering") graphite worms into flexible graphite sheet. The resulting sheet therefore has higher area weight uniformity and greater tensile strength, even when the starting graphite particles are as small as 200 U.S. mesh or smaller. The lubricious additive is preferably a long chain hydrocarbon, more preferably a hydrocarbon having at least about 10 carbon atoms. Other organic compounds having long chain hydrocarbon groups, even if other functional groups are present, can also be employed.

More preferably, the lubricious additive is an oil, with a mineral oil being most preferred, especially considering the fact that mineral oils are less prone to rancidity and odors, which can be an important consideration for long term storage. It will be noted that certain of the expansion aids detailed above also meet the definition of a lubricious additive. Exemplary of these are certain of the carboxylic acids, such as formic, acetic, propionic, butyric, pentanoic, hexanoic, and the like. When these materials are used as the expansion aid, it may not be necessary to include a separate lubricious additive in the intercalant.

The lubricious additive is present in the intercalant in an amount of at least about 1.4 pph, more preferably at least about 1.8 pph. Although the upper limit of the inclusion of lubricous additive is not as critical as the lower limit, there does not appear to be any significant additional advantage to including the lubricious additive at a level of greater than about 4 pph.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes, as hereinafter described.

Flexible graphite sheet and foil are coherent, with good handling strength, and are suitably compressed by, e.g. compression molding, to a thickness of about 0.025 mm to 3.75 mm and a typical density of about 0.1 to 1.5 grams per cubic centimeter (g/cc).

The flexible graphite sheet can also, at times, be advantageously treated with resin and the absorbed resin, after curing, enhances the moisture resistance and handling strength, i.e. stiffness, of the flexible graphite sheet as well as "fixing" the morphology of the sheet. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether of bisphenol A (DGEBA) and other multifunctional resin systems; phenolic resins that can be employed include resole and novolak phenolics.

Alternatively, the flexible graphite sheets of the present invention may utilize particles of reground flexible graphite sheets rather than freshly expanded worms. The sheets may be newly formed sheet material, recycled sheet material, scrap sheet material, or any other suitable source.

Also the processes of the present invention may use a blend of virgin materials and recycled materials.

The source material for recycled materials may be sheets or trimmed portions of sheets that have been compression molded as described above, or sheets that have been compressed with, for example, pre-calendering rolls, but have not yet been impregnated with resin. Furthermore, the source material may be sheets or trimmed portions of sheets that have been impregnated with resin, but not yet cured, or sheets or trimmed portions of sheets that have been impregnated with resin and cured. The source material may also be recycled flexible graphite PEM fuel cell components such as flow field plates or electrodes. Each of the various sources of graphite may be used as is or blended with natural graphite flakes.

Once the source material of flexible graphite sheets is available, it can then be comminuted by known processes or devices, such as a jet mill, air mill, blender, etc. to produce particles. Preferably, a majority of the particles have a diameter such that they will pass through 20 U.S. mesh; more preferably a major portion (greater than about 20%, most preferably greater than about 50%) will not pass through 80 U.S. mesh. Most preferably the particles have a particle size of no greater than about 20 mesh. It may be desirable to cool the flexible graphite sheet when it is resin-impregnated as it is being comminuted to avoid heat damage to the resin system during the comminution process.

The size of the comminuted particles may be chosen so as to balance machinability and formability of the graphite article with the thermal characteristics desired. Thus, smaller particles will result in a graphite article which is easier to machine and/or form, whereas larger particles will result in a graphite article having higher anisotropy, and, therefore, greater in-plane electrical and thermal conductivity.

If the source material has been resin impregnated, then preferably the resin is removed from the particles. Details of the resin removal are further described below.

Once the source material is comminuted, and any resin is removed, it is then re-expanded. The re-expansion may occur by using the intercalation and exfoliation process described above and those described in U.S. Pat. No. 3,404, 061 to Shane et al. and U.S. Pat. No. 4,895,713 to Greinke et al.

Typically, after intercalation the particles are exfoliated by heating the intercalated particles in a furnace. During this exfoliation step, intercalated natural graphite flakes may be added to the recycled intercalated particles. Preferably, during the re-expansion step the particles are expanded to have a specific volume in the range of at least about 100 cc/g and up to about 350 cc/g or greater. Finally, after the re-expansion step, the re-expanded particles may be compressed into flexible sheets, as hereinafter described.

If the starting material has been impregnated with a resin, the resin should preferably be at least partially removed from the particles. This removal step should occur between the comminuting step and the re-expanding step.

In one embodiment, the removing step includes heating the resin containing regrind particles, such as over an open flame. More specifically, the impregnated resin may be heated to a temperature of at least about 250° C. to effect resin removal. During this heating step care should be taken to avoid flashing of the resin decomposition products; this can be done by careful heating in air or by heating in an inert atmosphere. Preferably, the heating should be in the range of from about 400° C. to about 800° C. for a time in the range of from at least about 10 and up to about 150 minutes or longer.

Additionally, the resin removal step may result in increased tensile strength of the resulting article produced from the molding process as compared to a similar method in which the resin is not removed. The resin removal step may also be advantageous because during the expansion step (i.e., intercalation and exfoliation), when the resin is mixed with the intercalation chemicals, it may in certain instances create toxic byproducts.

Thus, by removing the resin before the expansion step a superior product is obtained such as the increased strength characteristics discussed above. The increased strength characteristics are a result of in part because of increased expansion. With the resin present in the particles, expansion may be restricted.

In addition to strength characteristics and environmental concerns, resin may be removed prior to intercalation in view of concerns about the resin possibly creating a run away exothermic reaction with the acid.

In view of the above, preferably a majority of the resin is removed. More preferably, greater than about 75% of the resin is removed. Most preferably, greater than 99% of the resin is removed.

Once the flexible graphite sheet is comminuted, it is formed into the desired shape and then cured (when resin impregnated) in the preferred embodiment. Alternatively, the sheet can be cured prior to being comminuted, although post-comminution cure is preferred.

Regardless of the source, a flexible graphite sheet is then formed. Formation is by compression, such as calendering, compression molding, isostatic molding or other like processes. Interestingly, the isotropy/anisotropy of the final article can be varied by the compression pressure, the particular compression process utilized and the size of the particles. For instance, calendering will result in greater alignment of the graphene layers and, thus, a more anisotropic final product, than isostatic molding. Likewise, an increase in pressure will also result in an increase in anisotropy. Thus, adjustment of the compression process and pressure, as well as selection of particle size, can lead to controllable variations in isotropy/anisotropy. Typical pressures employed range from under about 7 MegaPascals (MPa) to at least about 240 MPa.

Regardless of the source of graphite particles used to form the inventive sheet, a sacrificial additive is admixed with the particles of graphite prior to compression. The sacrificial additive can be any material that can be at least partially removed by treatment of the sheet, to leave behind a porous structure sufficient to permit diffusion of gases through the sheet. The sacrificial additive can comprise a thermally stable material that can be included with the intercalated graphite prior to expansion, provided the additive is stable at expansion temperatures, and provided further that the additive can be solvated out of the flexible graphite sheet after formation. Preferably, however, the sacrificial additive is admixed with the expanded graphite particles prior to compression but subsequent to expansion. In this way, heat can be used to remove the additive after formation of the sheet. Indeed, because the graphite is thermally stable up to relatively high temperatures, temperatures as high as about 500° C. or even higher can be used to at least partially remove the sacrificial additive.

Suitable materials useful as the sacrificial additive of the present invention include any heat stabile material that can be admixed with the expanded graphite particles prior to compression. Exemplary of such materials are methylcellulose, paper fiber, microballoons (derived from pitch or polymers, for instance, and ammonia carbonate. Other suitable materials include inorganic fibers, certain resin compounds (thermoplastic or thermoset), buckminsterfullerenes (i.e., bucky balls), etc. Indeed, it is not necessary that the material selected be a solid at room temperature. The sacrificial additive is admixed with the exfoliated graphite at a level appropriate for the pore structure/level of permeability desired. For instance, to produce a material that can be employed to form a GDL for a PEM fuel cell, the sacrificial additive can be included at a level of from about 5 pph to about 20 pph, more preferably about 8 pph to about 15 pph. Greater or lesser amounts of sacrificial additive can be used, depending on the desired pore structure and end use. For instance, there are applications in which as little as about 2 pph or less of sacrificial additive is needed.

After formation of the admixed graphite particles and sacrificial additive into a flexible graphite sheet, the sheet is treated to at least partially (and most preferably, completely) remove the sacrificial additive and, thus, create the desired pore structure. Treatment can be by the application of a solvent like acetone, or by exposing the sheet to heat, or other additive removal mechanism, depending on the nature of the sacrificial additive. In the preferred embodiment, removal of the sacrificial additive is by the application of heat to the sheet, at temperatures of up to 250° C. or even as high as 500° C. or higher. The time of heat treatment is again dependent on the sacrificial additive, as well as the amount of sacrificial additive present, but is generally for at least about 10 minutes, more advantageously at least about 30 minutes. Although there is no critical upper limit to the heat treatment time, treatment for longer than one hour is generally not necessary. Heat treatment can be by any suitable apparatus, such as an oven through which the sheet is fed.

Removal of the sacrificial additive results in the formation of a flexible graphite sheet having pores throughout it, such that interconnection of the pores (reminiscent of a "foam" pattern or structure) creates pathways from one major surface of the sheet to the other major surface of the sheet. In this way, permeability of the sheet is controllably created.

Additionally, it may be desirable in certain applications to selectively reduce the sheet thickness in order to increase the rate of permeation of gas through the sheet. For example, the sheet can be indented at selected locations, such that the thickness of the sheet at the indentations is reduced, thereby providing a shorter pathway for the gas to travel through the sheet. Indentation can be accomplished during the formation of the sheet, either through incorporating protrusions on a calender roller or one of the elements of a compression molding apparatus. Or, indentation can be accomplished after sheet formation, by the use of a roller having protrusions, or a pin stamping apparatus like a Pinstamp® device available from Telesis Technologies, Inc. of Circleville, Ohio.

The gas permeable sheet of flexible graphite can also be provided with a groove formed in one of its major surfaces, as taught in U.S. Pat. No. 6,528,199 to Mercuri et al., the disclosure of which is incorporated herein by reference. This groove, when combined with a cover sheet, as disclosed, can function to create a combination gas diffusing electrode/flow field plate, having advantages in the production of electrochemical fuel cells.

Figure 2:
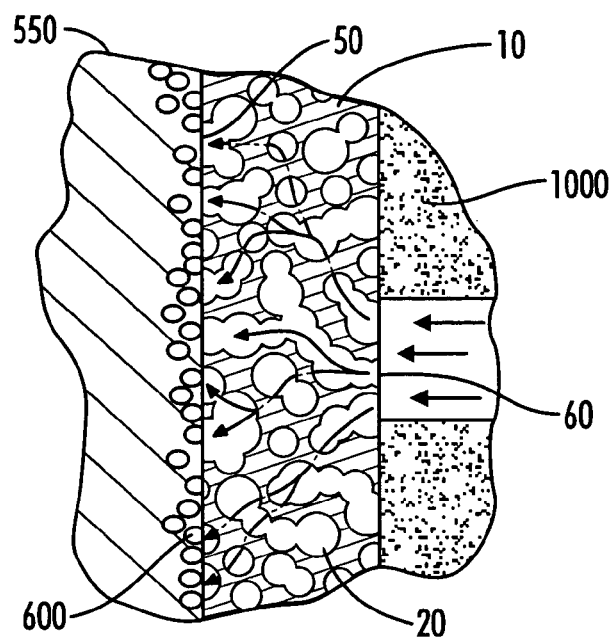
FIG. 2 is an enlarged view of a portion of the fuel cell of FIGS. 1 and 2 showing the placement of catalyst adjacent the electrodes.
Figure 3:
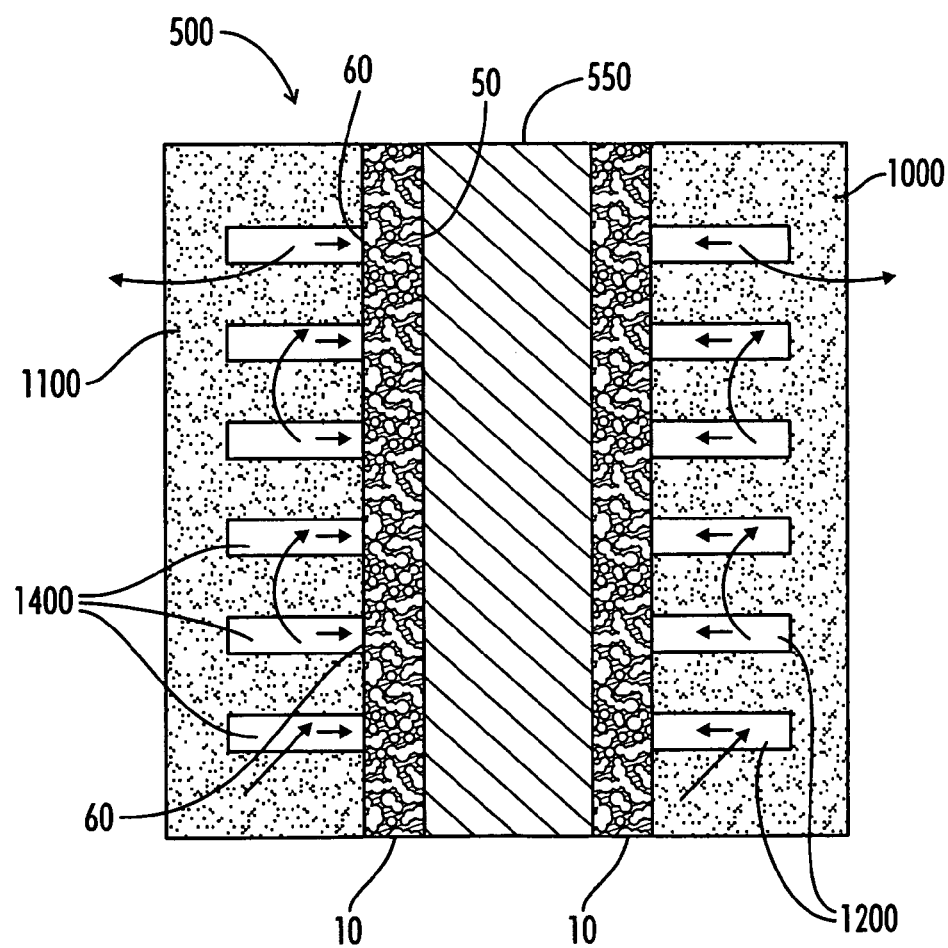
FIG. 3 is a further view of the fuel cell of FIG. 1.

The gas permeable flexible graphite sheet of the present invention is used as an electrode in an electrochemical fuel cell 500 shown schematically in FIGS. 1-3.

FIGS. 1-3 show, schematically, the basic elements of an electrochemical fuel cell, more complete details of which are disclosed in U.S. Pat. Nos. 4,988,583 and 5,300,370 and PCT WO 95/16287 (15 Jun. 1995) and each of which is incorporated herein by reference.

With reference to FIGS. 1-3, the fuel cell indicated generally at 500, comprises electrolyte in the form of a plastic e.g. a solid polymer ion exchange membrane 550; perforated flexible graphite sheet electrodes 10 in accordance with the present invention; and flow field plates 1000, 1100 which respectively abut electrodes 10. Pressurized fuel is circulated through grooves 1400 of fuel flow field pate 1100 and pressurized oxidant is circulated through grooves 1200. In operation, the fuel flow field plate 1100 becomes an anode, and the oxidant flow field plate 1000 becomes a cathode with the result that an electric potential, i.e. voltage is developed between the fuel flow field plate 1000 and the oxidant flow field plate 1100. The above described electrochemical fuel cell is combined with others in a fuel cell stack to provide the desired level of electric power as described in the above-noted U.S. Pat. No. 5,300,370.

The operation of fuel cell 500 requires that the electrodes 10 be porous to the fuel and oxidant fluids, e.g. hydrogen and oxygen, to permit these components to readily pass from the grooves 1400, 1200 through electrodes 10 to contact the catalyst 600 on the surfaces of the membrane 550, as shown in FIG. 2, and enable protons derived from hydrogen to migrate through ion exchange membrane 550.

Thus, by the practice of the present invention, a gas permeable flexible graphite sheet, usable, for instance, as an electrode in an electrochemical fuel cell, is provided. The inventive sheet has superior gas permeation properties to those materials conventionally applied for similar purposes.

All cited patents and publications referred to in this application are incorporated by reference.

The invention thus being described, it will be obvious that it may be varied in many ways. Such variations are not to be regarded as a departure from the spirit and scope of the present invention and all such modifications as would be obvious to one skilled in the art are intended to be included within the scope of the following claims.

What is claimed is:

1. A process for preparing a gas permeable flexible graphite sheet for a proton exchange membrane fuel cell, comprising:
    (a) providing exfoliated graphite flakes;
    (b) admixing the exfoliated graphite flakes with a sacrificial additive to form a graphite mixture;
    (c) compressing the graphite mixture into a sheet having two major surfaces, the sheet having sacrificial additive dispersed therethrough;
    (d) impregnating the sheet with a resin;

(e) treating the sheet to at least partially remove the sacrificial additive to form a permeable flexible graphite sheet having pathways extending from one major surface of the sheet to the other major surface of the sheet; and (f) incorporating the resin-impregnated permeable flexible graphite sheet into a proton exchange membrane fuel cell.

2. The process of claim 1 wherein a pattern is embossed on the sheet.

3. The process of claim 2 wherein the pattern is embossed on the sheet prior to treatment of the sheet to at least partially remove the sacrificial additive.

4. The process of claim 2 wherein the pattern is embossed on the sheet subsequent to treatment of the sheet to at least partially remove the sacrificial additive.

5. The process of claim 1 wherein the sacrificial additive is selected from the group consisting of methylcellulose, paper fiber, microballoons, ammonia carbonate, inorganic fibers, thermoplastic resin compounds, thermoset resin compounds, buckminsterfullerenes, and mixtures thereof.

6. The process of claim 5 wherein the sacrificial additive is present in the graphite mixture at a level of up to about 20 pph.

7. The process of claim 1 wherein the sheet is treated to at least partially remove the sacrificial additive by exposing the sheet to heat.

8. The process of claim 7 wherein the sheet is exposed to a temperature of at least about 250° C. to at least partially remove the sacrificial additive.

9. The process of claim 8 wherein the heat treatment is for at least about 10 minutes.

10. A process for preparing a gas permeable flexible graphite sheet for a proton exchange membrane fuel cell, comprising:

(a) providing graphite flakes;

(b) admixing the graphite flakes with a sacrificial additive to form a graphite mixture;

(c) expanding the graphite flakes;

(d) compressing the graphite mixture into a sheet having two major surface, the sheet having sacrificial additive dispersed therethrough;

(e) impregnating the sheet with a resin;

(f) treating the sheet to at least partially remove the sacrificial additive to form a permeable flexible graphite sheet having pathways extending from one major surface of the sheet to the other major surface of the sheet;

(g) incorporating the resin-impregnated permeable flexible graphite sheet into a proton exchange membrane fuel cell.

11. The process of claim 10 wherein the sacrificial additive is selected from the group consisting of methylcellulose, paper fiber, microballoons, ammonia carbonate, inorganic fibers, thermoplastic resin compounds, thermoset resin compounds, buckminsterfullerenes, and mixtures thereof.

12. The process of claim 11 wherein the sacrificial additive is present in the graphite mixture at a level of up to about 20 pph.

13. The process of claim 10 wherein the sheet is treated to at least partially remove the sacrificial additive by exposing the sheet to heat.

14. The process of claim 13 wherein the sheet is exposed to a temperature of at least about 250° C. to at least partially remove the sacrificial additive.

15. The process of claim 14 wherein the heat treatment is for at least about 10 minutes.

* * * * *